Patented May 17, 1938

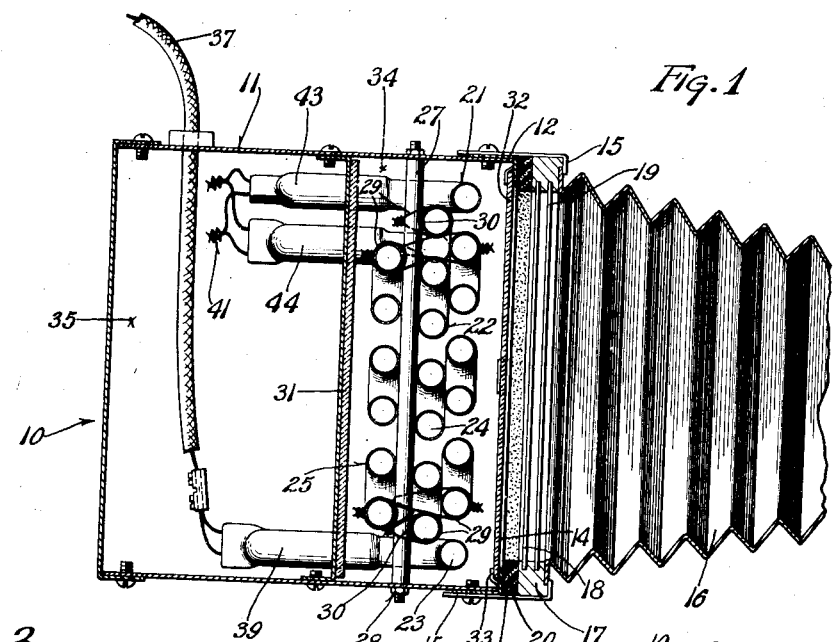
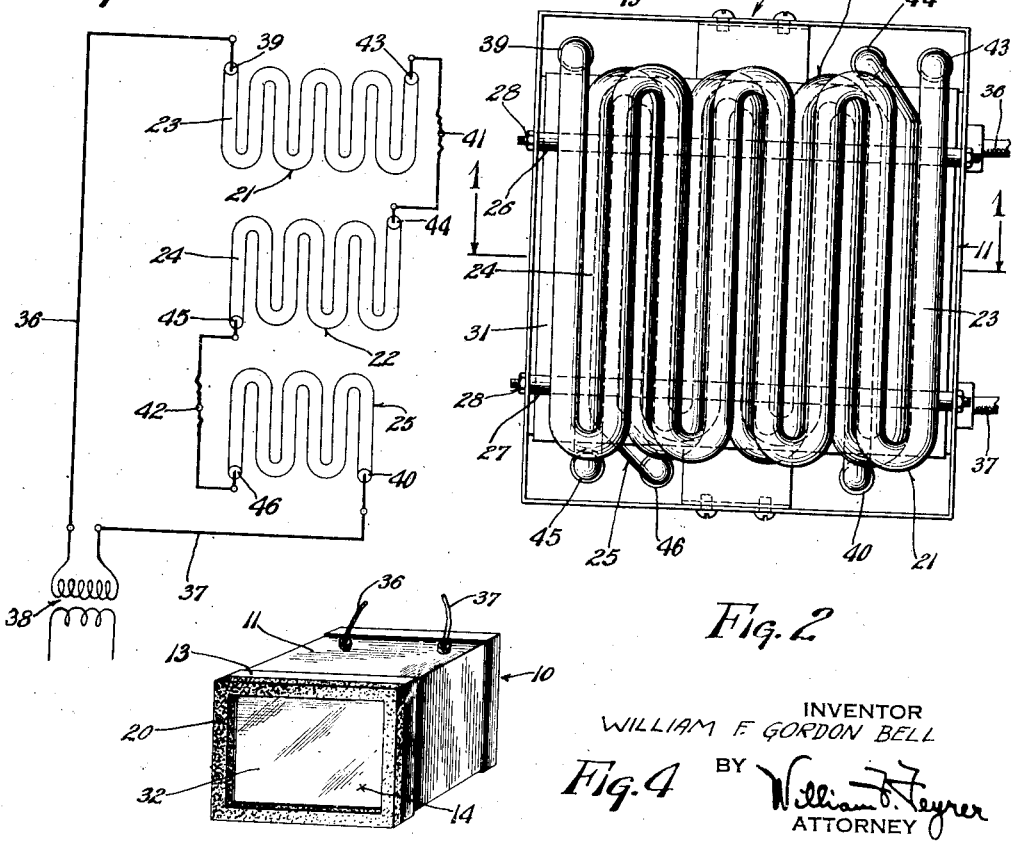

2,117,754

UNITED STATES PATENT OFFICE 2,117,754

PHOTOGRAPHIC ENLARGER LAMPHOUSE

William F. Gordon Bell, Norwalk, Conn., assignor to The McKibbin Neon Incorporated, Norwalk, Conn., a corporation of Connecticut Application February 19, 1937, Serial No. 126,594

6 Claims. (Cl. 88—24)

This invention relates to a photographic enlarger lamphouse.

It is an object of the invention to provide a lamphouse for photographic enlarging cameras which not only produces an even light, but also one that lies essentially in the blue portion of the spectrum so as to be highly efficient in its action on the sensitized paper on which the print, usually enlarged, is to be made.

It is a further object of the invention to provide a photographic enlarger lamphouse in which the danger of overheating and resultant injury to the negative is eliminated.

Heretofore in an effort to solve the problem of providing an even light for the enlarging camera, lamps have been devised in which the primary light source is an electric arc. In order that the light from such an arc, which is theoretically a pin source, may be spread evenly across the surface of the negative it is customary to utilize a pair of condenser lenses interposed between the arc and the negative. While such a lamp, when used with condenser lenses, does supply a substantially even light the heat generated by the arc is so great that unless some special cooling means is provided there is a real danger of cracking the condensers and the negative carrier glass, and of melting, sweating or buckling the negative during exposure. Moreover, because of the intense heat produced at the arc it is necessary to place both the arc and the condenser lenses some distance from the negative. This results in a loss of a portion of the useful light that ultimately reaches the enlarging camera.

Another type of lamp devised and used with enlarging cameras utilizes a tungsten incandescent lamp as the primary light source together with a parabolic reflector and a diffusion screen to produce an even flat light to be transmitted through the negative. Lamps of this type have been successfully employed but, as in the case of the lamp using an electric arc as the primary light source, generate an excess amount of heat which adversely affects the negative, especially if exposed for any considerable period of time as when a number of prints are being made. Moreover, because of the fact that the spectrum produced by the tungsten lamp contains many colors in addition to the actinically useful blue which acts on the sensitized paper to reproduce the negative thereon, the efficiency of the lamp per unit of power input is not great.

Photographic enlarger lamps utilizing a "Cooper-Hewitt" vacuum tube as the primary light source have also been used and met with some success. Such a light source while producing useful blue light also generates considerable heat. Because of this fact and the difficulties of designing a light source utilizing such a tube to produce an evenly distributed light the use of such tubes in photographic enlargers has been limited.

In order to overcome the above objections and to provide a photographic enlarger lamp which is especially efficient in its operation from the standpoint of power consumption and which attains the objects initially set forth there is provided as a feature of the present invention a lamp especially adapted for use with enlarging cameras which embodies as its light source an electric discharge tube containing one of the rare gases of the atmosphere, in the group including helium, argon, neon, krypton and xenon, and a small globule of mercury, so formed and so positioned in the lamphouse casing that the light produced thereby and directed to the negative in the enlarging camera is both flat and evenly distributed over the entire surface thereof. Because of the fact that the light produced by the mercury-rare atmospheric gas tube lies essentially in the blue portion of the spectrum the efficiency of the lamp from the standpoint of power consumption is very great. In addition, because of the fact that relatively little heat is required or generated by an electric discharge tube containing a rare atmospheric gas, the danger of overheating with resultant injury to the negative is eliminated. The elimination of this danger of overheating makes possible the placing of the light source close to the negative, thus further increasing the efficiency of the unit.

A further feature of the invention resides in providing in combination with the mercury-rare atmospheric gas tube light source a neon tube which serves the dual function of enabling a proper focusing of the image produced by the enlarging camera and of indicating to the operator the time at which the mercury-rare atmospheric gas tube has reached its maximum point of light emitting efficiency. This latter phenomenon is due to the fact that when the power is initially turned on the neon tube immediately reaches its working brightness, whereas the mercury-rare atmospheric gas tube, because of its nature, takes approximately five to seven minutes to reach its point of maximum efficiency. Hence the light is distinctly red at the outset, but as the mercury-rare atmospheric gas tube increases in brightness the red is almost obscured. This effect is achieved by placing the neon tube behind the mercury-rare atmospheric gas light source and by making the red neon light source small relative to that of the blue. When, therefore, the red light is largely obscured and the color from the lamp unit ceases to change, a visual indication is given to the operator that the blue light source has reached its maximum efficiency and that the unit is then ready for use.

Another feature of the invention resides in the provision of a novel support for the respective electric discharge tubes in the lamphouse casing.

Yet another feature of the invention consists in providing in a lamphouse a reflector which divides the casing into a forward chamber for receiving an electric discharge tube and a rear chamber for receiving rearwardly extending terminal portions of an electric discharge tube.

Other objects and features will hereinafter appear.

In the drawing:

Figure 1 is a sectional view of the photographic enlarger lamphouse provided by the present invention taken on the line 1—1 of Fig. 2 and showing incorporated therewith a fragmentary portion of an enlarging camera.

Fig. 2 is a front view of the lamphouse shown in Fig. 1 with the frame at the forward end thereof removed.

Fig. 3 is a view showing the wiring diagram used in the lamphouse disclosed in Figs. 1 and 2.

Fig. 4 is a perspective view of the lamphouse.

Referring more particularly to the drawing there is disclosed a lamphouse 10 including a casing 11, which may be as illustrated of substantially rectangular shape, having a forward end 12 with which there is associated a frame 13 defining a light opening 14 and to which there may be secured, as by clamps 15 an enlarging camera 16. Because any conventional enlarging camera may be associated with the casing a fragmentary portion only of a well known camera is disclosed. As is conventional, the camera includes a frame portion 17 adapted to be positioned immediately adjacent the lamphouse casing, supporting a pair of spaced glass plates 18 and 19 between which there may be inserted the negative from which the enlargement is to be made. A mounting 20 of sponge rubber or the like may be secured to the frame 13 at the forward end of the casing 11 to provide a light tight connection between the casing and the enlarging camera when the latter is placed in position.

Now of particular importance there is positioned in the casing as the primary light source a device producing relatively little heat and emitting a cool light lying predominately in the blue portion of the spectrum. An electric discharge tube 21 containing mercury and one of the rare gases of the atmosphere in the group comprising helium, neon, xenon, krypton and argon provides such a light source. While argon has, because of its availability, been chiefly used in the tube 21, any of the other rare atmospheric gases may be used.

Because the light produced by this tube lies predominately in the blue portion of the spectrum it is especially suitable for action on sensitized printing paper to reproduce a negative thereon. This is of particular importance from the standpoint of power consumption because the power input to the tube is utilized almost entirely in the production of the actinically useful light in the predominately blue portion of the spectrum, whereas with the conventional tungsten incandescent lamp much of the power input is wasted in the production of the actinically valueless light lying in the red portion of the spectrum. Moreover, because of the fact that relatively little heat is produced by an electric discharge tube of this nature, in which one or more of the rare atmospheric gases is used, there is eliminated the danger of overheating with resultant injury to the negative due to cracking and sweating if it be of glass, and to melting and buckling if it be of the film type.

In order that the light supplied may be uniformly distributed over the entire surface of the negative to insure a proper reproduction on the light sensitive printing paper it has been found in practice that it is desirable to use a second electric discharge tube 22 containing mercury and a rare atmospheric gas in superposed relation to the tube 21, to form the tubes 21 and 22 with a plurality of spaced bars 23 and 24 respectively, and to so position the tubes that the bars of one tube are opposite the spaces between the bars of the other tube. This relationship between the respective bars of the tubes 21 and 22 is shown most clearly in Fig. 1 and in Fig. 2, the illustration in the latter figure being merely diagrammatic, but showing that the bars of one tube are positioned opposite the spaces between the bars of the other tube and that together the tubes cover an area coextensive with that of the light opening 14. A single tube may be used with the bars thereof closely adjacent, but the dual tube arrangement shown has proved to be more satisfactory.

Because of the fact that the light emitted from the blue tubes 21 and 22 usually requires approximately five or seven minutes to reach its point of maximum intensity and because of the fact that it is extremely difficult to focus the enlarging camera 16 with a blue light, there is incorporated in the casing 11 in combination with the tubes 21 and 22 a smaller electric discharge tube 25 containing neon for producing a light predominately in the red portion of the spectrum. With this combination of electric discharge tubes the operator is enabled, at the outset, to properly focus the image produced by the enlarging camera 11 by means of the red light from the neon tube which reaches its maximum intensity immediately upon the passing of a current therethrough. He is also given a visual indication of the point at which the tube containing mercury and the rare atmospheric gas reaches its point of maximum light emitting intensity because at that time the red light from the neon tube becomes largely obscured and the color from the lamphouse unit ceases to change. In order that this effect may be especially pronounced the neon tube 25 is positioned rearwardly of the tubes 21 and 22 containing mercury and the rare atmospheric gas.

The supporting means provided by the present invention for maintaining the respective tubes in proper relation includes a pair of spaced insulated bars 26 and 27 extending transversely of the casing 11 intermediate the neon tube 25 and the mercury-rare atmospheric gas tube 22 and secured to the side walls of the casing, as by the screw and nut connection 28 shown. Tie wires 29 serve to firmly hold each of the tubes 21, 22 and 25 relative to the supporting bars, while small pieces of cork 30 interposed between the supporting bars and the immediately adjacent tubes serve as cushions and additional insulation.

To increase the efficiency of the lamphouse unit and to insure that the light projected through the light opening 14 to the negative mounted in the enlarging camera 16 is especially uniform there is mounted in the casing 11 a reflector 31, which may be of the conventional flat glass mirror type as shown, and there is positioned in the light opening 14 a diffusing screen 32 of opal glass, or the like, held in position by fingers 33 on the frame 13.

It is to be noted that the reflector 31, in addition to serving as a means for increasing the light emitting efficiency of the unit, serves also to divide the casing 11 into a forward lamp chamber 34 and a rear chamber 35 for housing the electrical wiring and the respective rearwardly extending terminal portions 39, 40, 43, 44, 45 and 46 of the electric discharge tubes. This is of importance in that the delicate tubes are thus protected from inadvertent breakage as by the dropping of tools and parts during the initial assembly operation and also during any subsequent adjustment of the electrical connections.

The electrical connections of the lamphouse are seen most clearly in Figs. 1 and 3. They include a pair of electrical conductors 36 and 37 leading from a transformer 38, which may be connected to the main power circuit, and through a side wall of the casing 11 to electrodes in the rearwardly extending terminal portions 39 and 40 respectively of one of the tubes 21 containing mercury and a rare atmospheric gas and of the tube 25 containing neon. Suitable connections 41 and 42 between the electrodes in the rearwardly extending terminal portions 43 and 44 of tubes 21 and 22 and between the electrodes in the rearwardly extending terminal portions 45 and 46 of tubes 22 and 25 respectively, place the entire system of tubes in series.

With the lamphouse forming the subject matter of the present invention it is seen therefore that there is provided a lighting unit which because of the cool and even light produced thereby is especially adapted to serve as the light source for an enlarging camera, and which because it produces actinically useful light predominately in the blue portion of the spectrum is especially efficient from the standpoint of power consumption. It is also seen that because of the novel combination and arrangement of the tubes containing mercury and the rare atmospheric gas and the tube containing the neon there is provided a lamphouse which enables a ready focusing of the image produced by the enlarging camera and which gives an automatic and visual indication of the time at which it is properly functioning.

Variations and modifications may be made within the scope of this invention and portions of the improvements may be used without others.

Having thus described the invention what is claimed as new is:

1. A lamphouse adapted to serve as the light source for an enlarging camera, comprising in combination a casing having a forward end with a light opening therein; an electric discharge tube containing mercury and a rare gas such as argon for producing a light predominately in the blue portion of the spectrum; and an electric discharge tube containing neon for producing a light predominately in the red portion of the spectrum to make it possible to focus the image produced by said enlarging camera and to indicate when said lamphouse is ready for printing use, said red light producing tube being so proportioned relative to said blue light producing tube that when the latter reaches a point of maximum printing light emitting intensity the blue light substantially obscures the red light from the lamphouse and the combined light from the lamphouse ceases to change, and said red and blue light producing tubes being associated to be energized concurrently.

2. A lamphouse adapted to serve as the light source for an enlarging camera, comprising in combination a casing having a forward end with a light opening therein; an electric discharge tube containing mercury and a rare atmospheric gas for producing a light predominately in the blue portion of the spectrum; and an electric discharge tube containing neon, smaller than and positioned rearwardly of said tube containing mercury and a rare atmospheric gas, for producing a light predominately in the red portion of the spectrum to make it possible to focus the image produced by said enlarging camera and to indicate when said lamphouse is ready for printing use, said red light producing tube being so proportioned relative to said blue light producing tube that when the latter reaches a point of maximum printing light emitting intensity the blue light substantially obscures the red light from the lamphouse and the combined light from the lamphouse ceases to change, and said red and blue light producing tubes being associated to be energized concurrently.

3. A lamphouse adapted to serve as the light source for an enlarging camera, comprising in combination a casing having a forward end with a light opening therein; a diffusing screen in the light opening; a reflector in said casing, spaced rearwardly of said light opening; an electric discharge tube containing mercury and a rare atmospheric gas for producing a light predominately in the blue portion of the spectrum; and an electric discharge tube containing neon, smaller than and positioned rearwardly of said tube containing mercury and a rare atmospheric gas, for producing a light predominately in the red portion of the spectrum to make it possible to focus the image produced by said enlarging camera and to indicate when said lamphouse is ready for printing use, said red light producing tube being so proportioned relative to said blue light producing tube that when the latter reaches a point of maximum printing light emitting intensity the blue light substantially obscures the red light from the lamphouse and the combined light from the lamphouse ceases to change, and said red and blue light producing tubes being associated to be energized concurrently.

4. A lamphouse adapted to serve as the light source for an enlarging camera, comprising in combination a casing having a forward end with a light opening therein; a pair of superposed electric discharge tubes containing mercury and a rare atmospheric gas for producing a light predominately in the blue portion of the spectrum, each tube having a plurality of spaced bars, and the bars of one tube being positioned opposite the spaces between bars of the other tube to provide a uniform light source; and an electric discharge tube containing neon, smaller than and positioned rearwardly of said tubes containing mercury and a rare atmospheric gas for producing a light predominately in the red portion of the spectrum to make it possible to focus the image produced by said enlarging camera and to indicate when said lamphouse is ready for printing use, said red light producing tube being so proportioned relative to said blue light producing tube that when the latter reaches a point of maximum printing light emitting intensity the blue light substantially obscures the red light from the lamphouse and the combined light from the lamphouse ceases to change, and said red and blue light producing tubes being associated to be energized concurrently.

5. A lamphouse adapted to serve as the light source for an enlarging camera, comprising in combination a casing having a forward end with a light opening therein; a reflector in said casing dividing the latter into a forward lamp chamber and a rear wiring chamber; an electric discharge tube containing mercury and a rare atmospheric gas for producing a light predominantly in the blue portion of the spectrum, positioned in said lamp chamber and having terminal portions extending rearwardly into said wiring chamber; and an electric discharge tube containing neon for producing light predominately in the red portion of the spectrum, positioned rearwardly of said first named tube in the lamp chamber and having terminal portions extending rearwardly into said wiring chamber, to make it possible to focus the image produced by said enlarging camera and to indicate when said lamphouse is ready for printing use, said red light producing tube being so proportioned relative to said blue light producing tube that when the latter reaches a point of maximum printing light emitting intensity the blue light substantially obscures the red light from the lamphouse and the combined light from the lamphouse ceases to change, and said red and blue light producing tubes being associated to be energized concurrently.

6. A lamphouse adapted to serve as the light source for an enlarging camera, comprising in combination a casing having a forward end with a light opening therein; a pair of superposed electric discharge tubes for producing a cool light predominately in the blue portion of the spectrum, each tube having a plurality of spaced bars and the bars of one tube being positioned opposite the spaces between the bars of the other tube to provide a uniform light source; an electric discharge tube for producing a cool light predominately in the red portion of the spectrum, positioned rearwardly of said first named tube; a plurality of insulated supporting bars extending transversely of the casing intermediate the superposed tubes and the rear tube; and means for tying said tubes to said insulated supporting bars.

WILLIAM F. GORDON BELL.